United States Patent [19]
Yamaguchi et al.

[11] Patent Number: 5,814,169
[45] Date of Patent: Sep. 29, 1998

[54] PNEUMATIC TIRE INCLUDING SIPES

[75] Inventors: Yuji Yamaguchi; Chishiro Tanabe, both of Kodaira, Japan

[73] Assignee: Bridgestone Corporation, Tokyo, Japan

[21] Appl. No.: 643,532

[22] Filed: May 6, 1996

Related U.S. Application Data

[63] Continuation of Ser. No. 323,718, Oct. 18, 1994, abandoned.

[30] Foreign Application Priority Data

Nov. 18, 1993 [JP] Japan ................................ 5-289211
Aug. 11, 1994 [JP] Japan ................................ 6-189312

[51] Int. Cl.$^6$ ........................................................ B60C 11/12
[52] U.S. Cl. .................................. 152/209 R; 152/DIG. 3
[58] Field of Search ........................... 152/209 R, 209 D, 152/DIG. 3

[56] References Cited

U.S. PATENT DOCUMENTS

| | | | |
|---|---|---|---|
| 4,619,300 | 10/1986 | Tokunaga et al. | 152/209 R |
| 4,649,975 | 3/1987 | Kogure et al. | |
| 4,796,683 | 1/1989 | Kawabata et al. | |
| 5,109,904 | 5/1992 | Numata et al. | |
| 5,361,816 | 11/1994 | Hitzky | 152/209 R |

FOREIGN PATENT DOCUMENTS

| | | | |
|---|---|---|---|
| 323 165 | 7/1989 | European Pat. Off. | |
| 325 552 | 7/1989 | European Pat. Off. | |
| 0 337 787 | 10/1989 | European Pat. Off. | |
| 391600 | 10/1990 | European Pat. Off. | 152/209 D |
| 0 468 815 | 1/1992 | European Pat. Off. | |
| 486 838 | 5/1992 | European Pat. Off. | |
| 543 267 | 5/1993 | European Pat. Off. | |
| 200007 | 9/1986 | Japan | 152/209 R |
| A-63-137003 | 6/1988 | Japan | |
| A-64-9008 | 1/1989 | Japan | |
| A-257407 | 2/1990 | Japan | |
| A-2-200503 | 8/1990 | Japan | |
| 167008 | 7/1991 | Japan | 152/209 D |
| A-3-153405 | 7/1991 | Japan | |
| 24105 | 1/1992 | Japan | 152/209 D |
| A-4-87805 | 3/1992 | Japan | |
| A-5-169922 | 7/1993 | Japan | |
| A-5-169923 | 7/1993 | Japan | |

OTHER PUBLICATIONS

Database WPI, AN 92–077406, Week 9210, Derwent Publications Ltd., London, Great Britain.
Patent Abstracts of Japan, vol. 14, No. 319 (M–996), Jul. 9, 1990, "Pneumatic radial tire for heavy load", Fumio Ogawa.

*Primary Examiner*—Steven D. Maki
*Attorney, Agent, or Firm*—Oliff & Berridge, PLC.

[57] ABSTRACT

Pneumatic tires according to this invention have a tread provided with blocks separated by circumferential grooves extending around the tread and lateral grooves crossing the circumferential grooves, the blocks being respectively provided with two lateral sipes, characterized in that the lateral end portions having small rigidity in block portions which are substantially separated by lateral sipes are reinforced by, for example, a platform. The invention has the effects of restraining block chipping in heavy duty tires and degrading of steering stability in passenger tires, and enhancing the performance on ice without degrading wet performance, by means of increasing sipe density and restraining lowering of the block rigidity.

4 Claims, 11 Drawing Sheets

X - X SECTIONAL VIEW

Y - Y SECTIONAL VIEW

Z1-Z1 SECTIONAL VIEW

Z2-Z2 SECTIONAL VIEW

A-A SECTIONAL VIEW

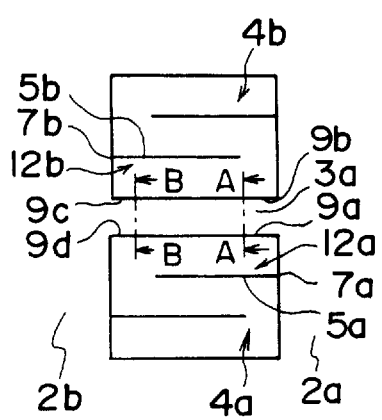
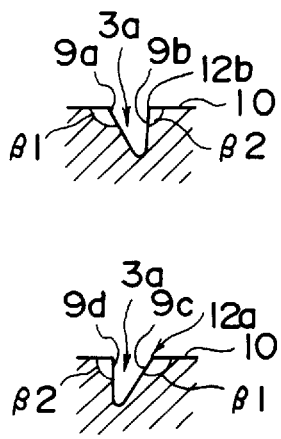
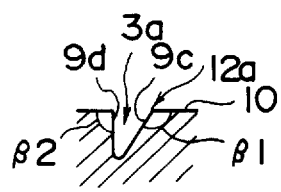
FIG. 8(a)
FIG. 8(b)
FIG. 8(c)
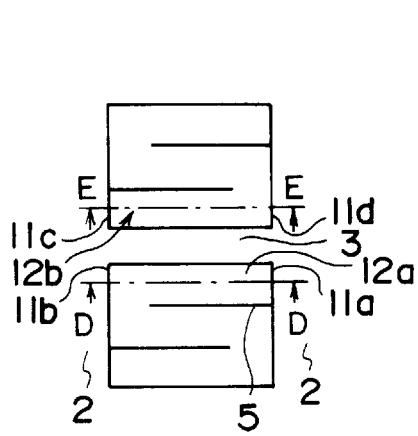
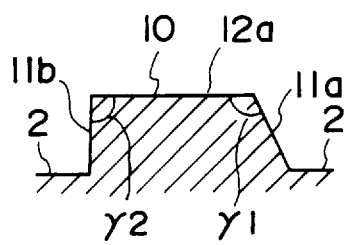
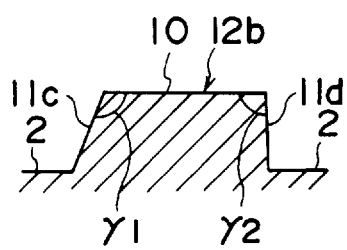
FIG. 9(a)
FIG. 9(b)
FIG. 9(c)

H-H SECTIONAL VIEW

I-I SECTIONAL VIEW

FIG. 15 (b) PRIOR ART

PNEUMATIC TIRE INCLUDING SIPES

This is a Continuation of application Ser. No. 08/323,718 filed Oct. 18, 1994, now abandoned.

BACKGROUND OF THE INVENTION

1. Field of the Invention

This invention relates to pneumatic tires, particularly tires for ice-snow road surfaces, having a tread provided with blocks separated by circumferential grooves extending around the tread and lateral grooves crossing the circumferential grooves and having plural lateral sipes in the blocks.

2. Description of the Prior Art

Recently various improvements have been made with respect to treads to obtain studless tires having good performance. It is effective for enhancing performance on ice road surfaces to increase edge components by forming a block pattern on the tread and arranging sipes in the blocks.

However, when plural both-end opening sipes extending in the lateral direction and opening to two circumferential grooves are formed in a block, for example, edge components are increased, while the rigidity of the whole block is decreased because the block is divided into several parts by the both-end opening sipes. As a result, sufficient performance on ice road surfaces cannot be obtained. In particular, arranging a both-end opening sipe adjacent to a lateral groove lowers the rigidity of a block portion substantially separated by this both-end opening sipe. Consequently, there is a possibility that the block may chip easily in the case of heavy duty tires because its deformation during driving and braking becomes large, and in case of passenger tires steering stability may be degraded because net contacting area is decreased by inclination of the block and steering stability on a dry road surface may also be degraded. Therefore it was necessary to obtain means for enhancing the performance on ice road surfaces to retain the block rigidity even while increasing the density of sipes.

It is useful as above mentioned means that a lateral sipe adjacent to a lateral groove is made (a) to be a one-end opening sipe opening to only one circumferential groove and being closed in the block, or (b) to be a both-end opening sipe with its depth at one end shallower than that at the other end, similarly to a pneumatic tire described in Japanese Patent Laid Open No. 2-200503.

However, according to an examination by the present inventors with respect to the local rigidity of the block, in the former case (a), the rigidity of a portion where the one-end opening sipe adjacent to the lateral groove opens to the circumferential groove is lower than that of the other portion because the block is substantially divided by the one-end opening sipe; and in the latter case (b), the rigidity of a portion where the sipe depth is deeper is lower than that of the other portion, and accordingly these portions having lower rigidity deform as much as a portion separated by a conventional both-end opening sipe having constant sipe depth. Therefore, in these cases also, sufficient rigidity in the portion having large deformation could not be obtained and the above mentioned problems were not overcome.

This invention relates to pneumatic tires provided with plural lateral sipes in the blocks and has objects of enhancing edge effect by increasing sipe density, restraining lowering of the block rigidity caused by increasing sipe density, restraining block chipping in heavy duty tires and degrading of steering stability in passenger tires, and enhancing the performance on ice road surfaces without degrading wet performance, by means of desirably arranging a lateral sipe adjacent to a lateral groove, which brings about lowered rigidity in the block, and reinforcing the block portion having rigidity lowered by forming this lateral sipe.

SUMMARY OF THE INVENTION

The present invention provides a pneumatic tire having a tread provided with blocks separated by circumferential grooves extending around the tread and lateral grooves crossing the circumferential grooves, the blocks being provided with plural lateral sipes, characterized by a reinforcing means to redress difference of the rigidity between both lateral end portions of a block portion which is substantially separated by a lateral sipe adjacent to a lateral groove among the lateral sipes.

It is preferable that the lateral sipe adjacent to the lateral grooves is a one-end opening sipe with one end opening to a circumferential groove or a lateral groove and with the other end substantially being closed in the block, or that the lateral sipe adjacent to the lateral groove is a both-end opening sipe with its both ends opening to circumferential grooves or lateral grooves and with its sipe depth at one end shallower than that at the other end.

Further it is preferable that as the reinforcing means a platform is arranged at a lateral groove portion facing one lateral end portion having smaller rigidity in the block portion; that the angle of a groove wall portion of the lateral groove facing the block portion with respect to a contacting surface of the block is made larger at one lateral end portion having smaller rigidity in the block portion than at the other lateral end portion; that the angle of a groove wall portion of the circumferential groove facing the block portion with respect to a contacting surface of the block is made larger at one lateral end portion having smaller rigidity in the block portion than at the other lateral end portion; or that a groove wall portion of the lateral groove facing a lateral end portion having smaller rigidity in the block portion is protruded from the other groove wall portion.

It is not necessary that the circumferential grooves are parallel with the equatorial plane of the tire or that the lateral grooves cross the equatorial plane at right angles. In this invention, sipes are arranged at a relatively large angle with respect to the direction of the rotation and the reverse-rotation of the tire. The block portion "substantially" separated by the lateral sipe adjacent to the lateral groove includes the case that the lateral sipe is a one-end opening sipe; in this case, the block portion is separated by an imaginary both-end opening sipe formed by extending the one-end opening sipe from the closed end to the lateral end of the block. Further when the lateral sipe is a one-end opening sipe, it is preferable that the length of the sipe is more than 50% of the imaginary both-end opening sipe.

BRIEF DESCRIPTION OF THE DRAWINGS

FIG. 8(a) is a plan view of a part of another tread according to this invention, and FIG. 8(b) and FIG. 8(c) are sectional views cut along the lines A—A and B—B thereof respectively;

FIG. 9(a) is a plan view of a part of another tread according to this invention, and FIG. 9(b) and FIG. 9(c) are sectional views cut along the lines D—D and E—E thereof respectively;

FIG. 15(b) is an enlarged view of a block of the block pattern of a comparative tire 4.

Throughout the drawings, like reference numerals indicate like parts.

DESCRIPTION OF THE PREFERRED EMBODIMENTS

Figure 1:
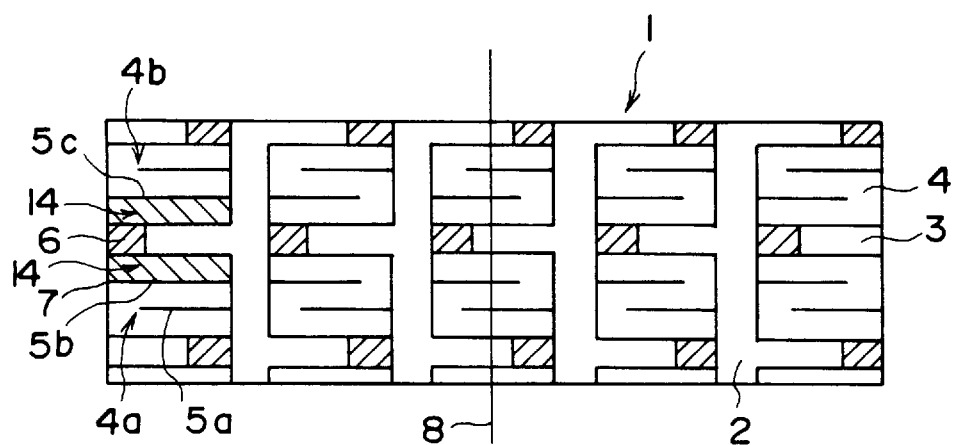
FIG. 1 shows a typical tread pattern of a pneumatic tire according to this invention.
Figure 2A:
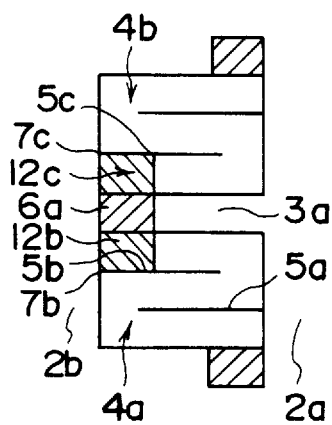
FIG. 2(a) is an enlarged plan view of a part of the tread of the tire shown in FIG. 1.
Figure 2B:
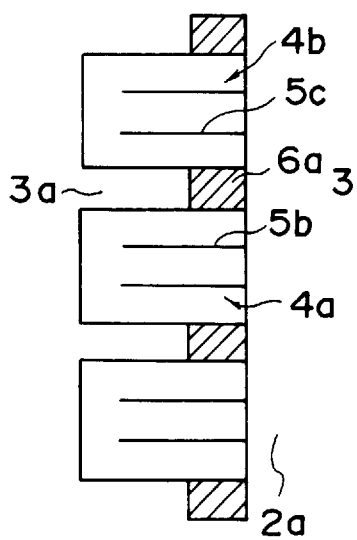
FIGS. 2(b)–(f) are plan views of parts of other treads according to this invention.
Figure 2C:
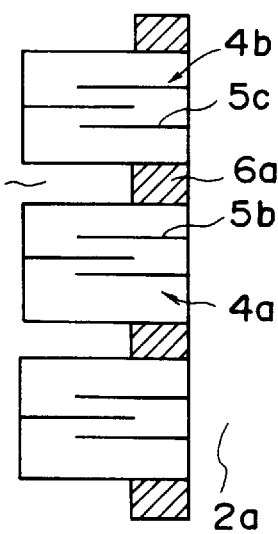
Figure 2D:
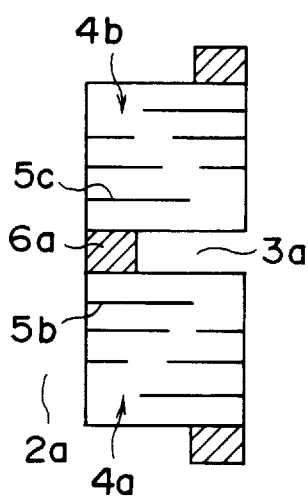
Figure 2E:
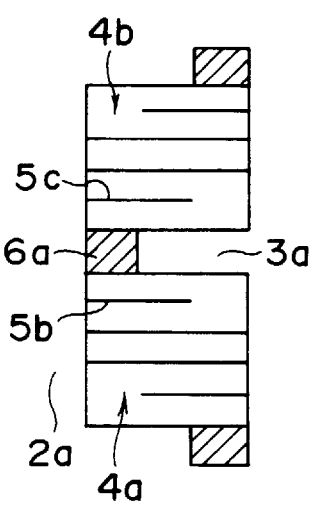

FIG. 1 shows a typical tread pattern according to this invention, and FIG. 2(a) shows an enlarged view of two blocks of this tire. In the drawings, reference numeral 1 shows a tread, 2 shows a circumferential groove, 3 shows a lateral groove, 4 shows a block, 5 shows a one-end opening sipe, 6 shows a platform, 7 shows an opening of the one-end opening sipe, and 8 shows the equatorial plane of the tire.

In this pneumatic tire, two straight lateral sipes 5a, 5b or 5a, 5c are formed in each rectangular block 4 which is separated by four circumferential grooves 2 extending straight in parallel with the equatorial plane 8 of the tire and lateral grooves 3 crossing the equatorial plane 8 at right angles and crossing the circumferential grooves 2. In this embodiment, the lateral sipes 5a, 5b or 5a, 5c are one-end opening sipes alternately arranged, but they are not limited to this arrangement and they can be, for example, both-end opening sipes having suitable sipe shape. The shape of the both-end opening sipe will be described later.

With respect to blocks 4a, 4b separated by a lateral groove 3a, in order to reinforce the lateral end portions 12b, 12c shown in FIG. 2(a) at the openings 7b, 7c side of the one-end opening sipes 5b, 5c in block portions 14 substantially separated by the one-end opening sipes 5b, 5c adjacent to the lateral groove 3a, a platform 6a is arranged in a portion of the lateral groove 3a facing the lateral end portions 12b, 12c. It is preferable that the height, the length in the circumferential direction and the lateral width of this platform 6a is respectively 0.25–0.75 times as large as the depth of the lateral groove 3, 0.5–1.0 times as large as the width of the lateral groove 3, and 0.2–0.5 times as large as the width of the block 4.

The platform 6 is formed to connect the blocks 4a and 4b facing each other in this embodiment, while the platform can be separated by a sipe or sipes from the block 4a and/or 4b, or at least one sipe can be formed in the platform 6.

Figure 2F:
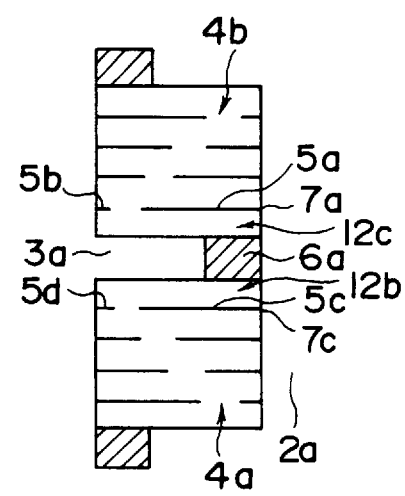

As other embodiments in which the block portion 12b, 12c is reinforced by arranging the platform 6a in the lateral groove 3a, FIGS. 2(b)–(e) show embodiments provided with the platform 6a arranged in the lateral groove 3a at the side of the circumferential groove 2a to which the lateral sipes 5b, 5c formed in the rectangular block 4a, 4b open, and FIG. 2(f) shows an embodiment in which two one-end opening sipes 5a, 5b and 5c, 5d adjacent to the lateral groove 3a are formed in each block 4b, 4a with each two sipes facing each other and the platform is arranged at a portion in the lateral groove 3a facing the lateral end portions 12b, 12c having smaller block rigidity.

Figure 3A:
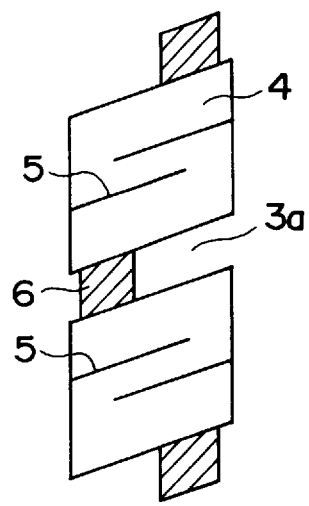
FIGS. 3(a) and (b) are plan views of parts of other treads according to this invention.
Figure 3B:
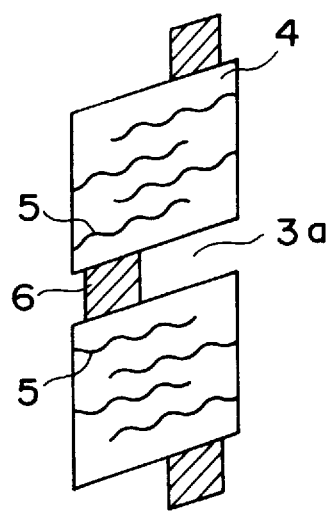

FIGS. 3(a) and (b) show embodiments in which the blocks 4 are parallelogram shaped and the one-end opening sipes 5 are formed substantially in parallel with the lateral groove 3a, wherein FIG. 3(a) shows the one-end opening sipes 5 formed straight and FIG. 3(b) shows the sipes 5 wavy.

Figure 4A:
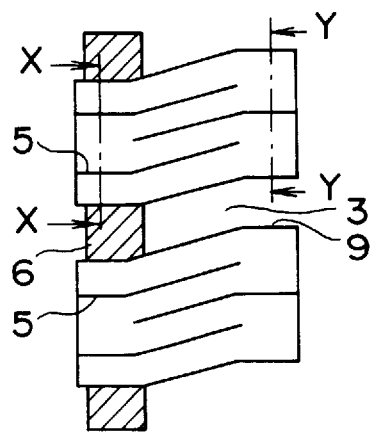
FIG. 4(a) is a plan view of a part of another tread according to this invention.
Figure 4B:
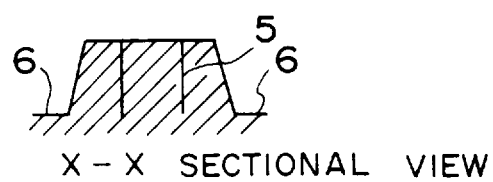
FIG. 4(b) is a sectional view of a block cut along the line X—X shown in FIG. 4(a)
Figure 4C:
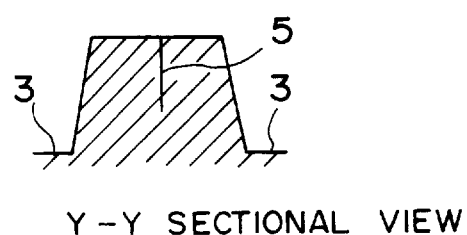
FIG. 4(c) is a sectional view of a block cut along the line Y—Y shown in FIG. 4(a)

Further FIG. 4(a) shows an embodiment in which groove walls 9 of the lateral groove 3 and the one-end opening sipes 5 are made bent. The block portion can be reinforced by making the depth of the opening portions of the one-end opening sipes 5 shallower than that of the other portion instead of providing the platform 6.

Figure 5A:
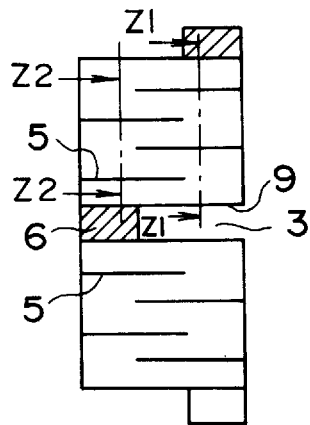
FIG. 5(a) is a plan view of a part of another tread according to this invention.
Figure 5B:
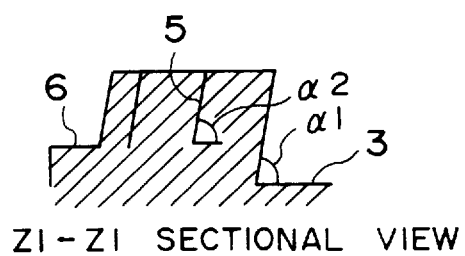
FIG. 5(b) is a sectional view of a block cut along the line Z1—Z1 shown in FIG. 5(a)
Figure 5C:
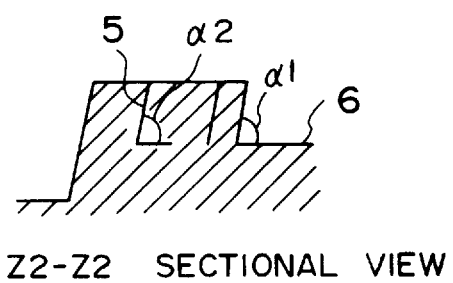
FIG. 5(c) is a sectional view of a block cut along the line Z2—Z2 shown in FIG. 5(a)

FIG. 5(a) shows an embodiment in which the angles α1 and α2 of the groove wall 9 of the lateral groove 3 and the one-end opening sipe 5 in the depth direction are made acute angles as shown in FIG. 5(b) and FIG. 5(c).

Figure 6:
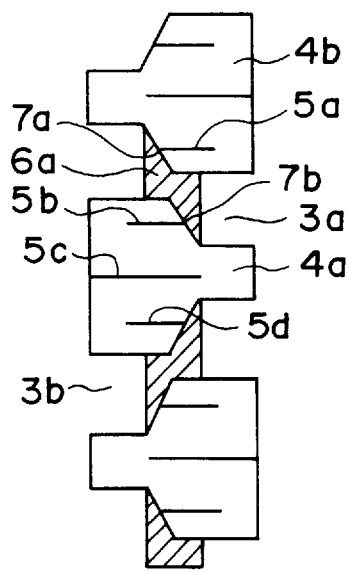
FIG. 6 is a plan view of a part of another tread according to this invention.

FIG. 6 shows an embodiment in which the blocks 4 have a specific shape and the one-end opening sipes 5a, 5b adjacent the lateral groove 3a are formed to open to this lateral groove 3a.

Figure 7A:
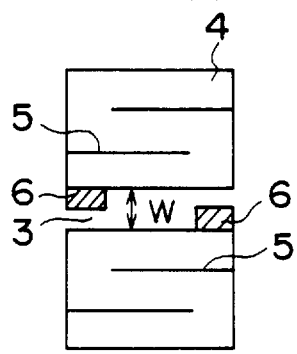
FIG. 7(a) is a plan view showing platforms arranged at a part of a lateral groove.

In the above mentioned embodiments, the platforms 6 are arranged to have a length corresponding to the whole width W of the lateral groove 3, while as shown in FIGS. 7(a) and (b) the platforms 6 can be arranged to only partially occupy the lateral groove width W. When a platform is arranged in a circumferential groove over the whole width or partially over the width, or in a lateral groove 3 over the whole width, there is possibility that the drainage ability is degraded.

Further, when two platforms extending across the lateral groove width W are arranged partially in the lateral groove 3, pattern noise caused by air pumping phenomenon in the tire grounding area is generated because the portion between the platforms 6 in the lateral groove 3 becomes a so-called blind groove; in addition, this pattern noise tends to increase as tread wearing progresses. Accordingly when the lateral end portion 12 having smaller rigidity is reinforced by a platform 6, it is preferable that only one platform 6 is provided in one portion of the lateral groove 3 facing the block portion 12.

As other embodiments, it is preferable that the lateral end portions 12a, 12b whose block rigidity is much lowered are reinforced by making the angle β1 obtuse, which angle is formed by the groove wall portion 9a, 9c in the lateral groove 3a facing the block portion 12a, 12b and the contacting surface 10 of the block as shown in FIG. 8; or by making the angle γ1 obtuse, which angle is formed by the groove wall portion 11a, 11c in the circumferential groove 2 facing the lateral end portions 12a, 12b and the contacting surface 10 of the block as shown in FIG. 9. In FIG. 8, β2 is 90°; and in FIG. 9, γ2 is 90°.

Figure 10A:
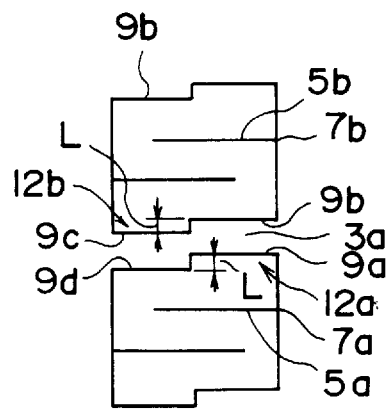
FIGS. 10(a), (b) and (c) are plan views of parts of other treads according to this invention.

Furthermore as shown in FIG. 10(a), the lateral end portions 12a, 12b whose block rigidity is much lowered can be reinforced by protruding the groove wall portions 9a, 9c in the lateral groove 3a facing the lateral end portions 12a, 12b from other groove wall portions 9b, 9d by a length L.

Figure 10B:
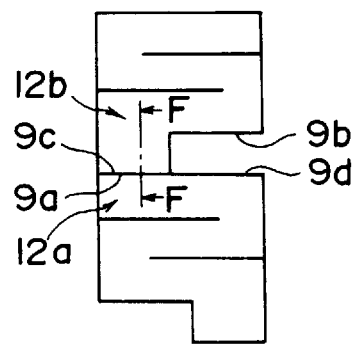
FIG. 10(d) is a sectional view cut along the line F—F in FIG. 10(b)
FIG. 10(e) is a sectional view cut along the line G—G in FIG. 10(c)
Figure 10C:
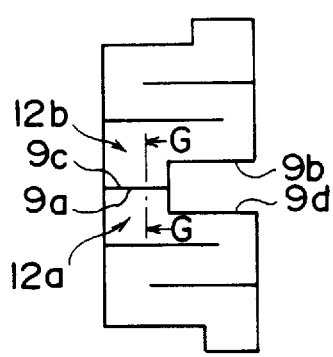
Figure 10D:
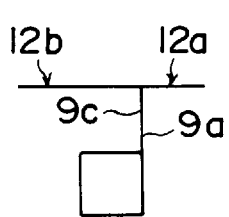
Figure 10E:
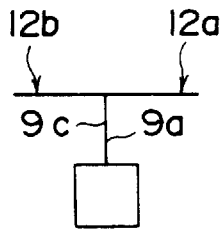

As other embodiments, the groove wall portion 9c can be protruded from the other wall portion 9b to be close to the groove wall portion 9a and separated by a sipe as shown in FIG. 10(b); and the groove wall portions 9c and 9a can be protruded from the other portions 9b, 9d facing each other and separated by sipes as shown in FIG. 10(c). In these embodiments, the bottom of the sipe separating the groove wall portions 9c, 9a needs to be enlarged as shown in FIGS. 10(d) and (e) in order to retain drainage ability.

Figure 12A:
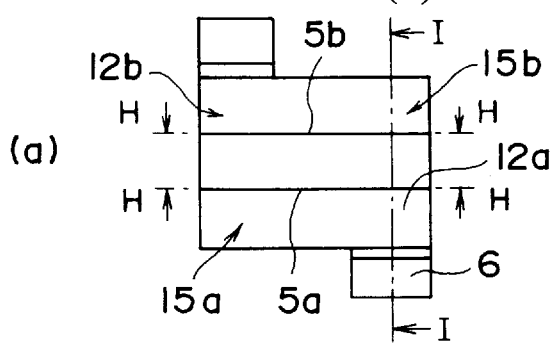
FIG. 12(a) is a plan view of a block provided with two both-end opening sipes having different sipe depths at both lateral end portions of the block.
Figure 12B:
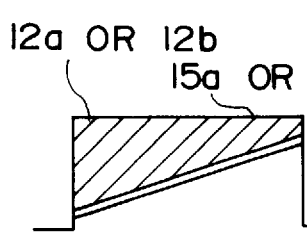
FIGS. 12(b)–(j) are views cut along the line H—H in the depth direction showing embodiments of various shapes of the both-end opening sipes.
Figure 12C:
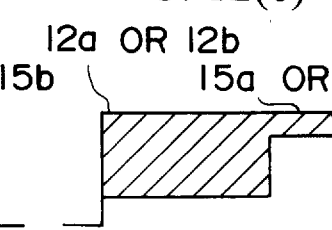
Figure 12D:
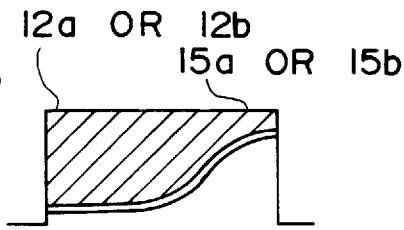
Figure 12E:
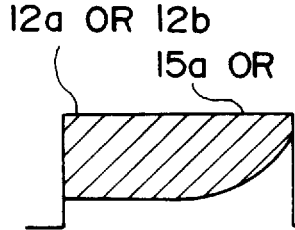
Figure 12F:
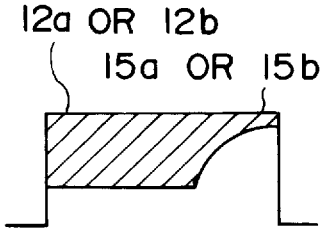
Figure 12G:
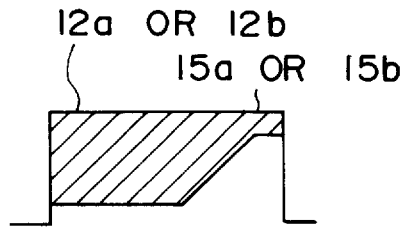
Figure 12H:
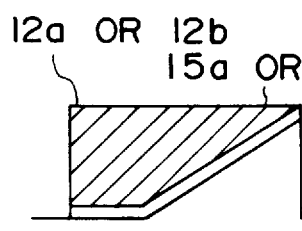
Figure 12I:
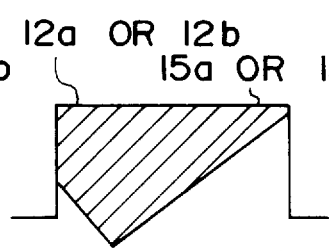
Figure 12J:
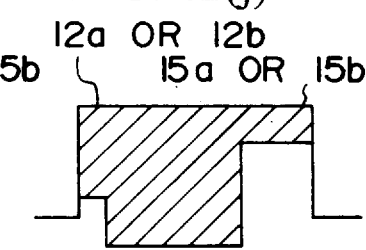
Figure 12K:
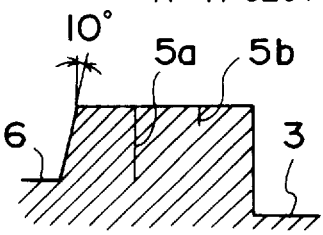
FIG. 12(k) is a view showing an embodiment cut along the line I—I of FIG. 12(a)

In each of the above mentioned embodiments, the lateral sipes 5a, 5b are one-end opening sipes. However, in other embodiments, the lateral sipes 5a, 5b can be both-end opening sipes as shown in FIG. 12(a). This embodiment has the same function as the above mentioned one-end opening sipe by making the lateral end portions 12a, 12b of the both-end opening sipes 5a, 5b deeper than the other lateral end portions 15a, 15b, as shown in FIGS. 12(b)–(k), and providing a reinforcing means (for example a platform 6 as shown in FIG. 12(a)) for reinforcing the reduced rigidity at the lateral end portions 12a, 12b.

The reason why one end of a one-end opening sipe "substantially" closes in the block is that a shallow lateral sipe seems to be a both-end opening sipe in new state but becomes a one-end opening sipe at the beginning of tread wearing.

According to the tires of this invention in comparison with conventional tires, though the sipe density is made large, the deformation of the whole and a part of the block 4 can be restrained by providing the reinforcing means to redress difference of the rigidity between both lateral end portions of a block portion which is substantially separated by a lateral sipe (specifically a one-end opening sipe or a both-end opening sipe having different depth between both ends) adjacent to the lateral groove among the lateral sipes, for example by arranging a platform 6 in a part of the lateral groove 3a facing the lateral end portions 12b, 12c having smaller rigidity in the block portion (FIG. 2(a)); by making the angle β1 of the groove wall portions 9a, 9c of the lateral groove 3a facing the lateral end portions 12a, 12b with respect to the contacting surface 10 of the block larger than the angle β2 of the groove wall portions 9b, 9d of the lateral groove 3a facing the other lateral end portions with respect to the contacting surface 10 of the block (FIG. 8); by making the angle γ1 of the groove wall portions 11a, 11c of the circumferential groove 2 facing the lateral end portions 12a, 12b with respect to the contacting surface 10 of the block larger than the angle γ2 of the groove wall portions 11b, 11d of the circumferential groove 2 facing the other lateral end portions with respect to the contacting surface 10 of the block (FIG. 9); or by making the groove wall portions 9a, 9c in the lateral groove 3a facing the lateral end portions 12a, 12b protrude from the other groove wall portions 9b, 9d (FIG. 10).

Further, in the tires of this invention, sufficient groove volume for drainage ability can be retained because the sipe density is made large and the lateral end portion 12 having decreased rigidity caused by forming sipes is reinforced locally and effectively.

The decreasing of the block rigidity by forming the lateral sipes is outstanding when the lateral sipe is adjacent to the lateral groove, and a sipe other than the sipe adjacent to the lateral groove (when the block 4 is provided with not less than three lateral sipes) can be a conventional both-end sipe having constant depth and can be changeable because local decreasing of the block rigidity by forming this sipe is small.

Figure 7B:
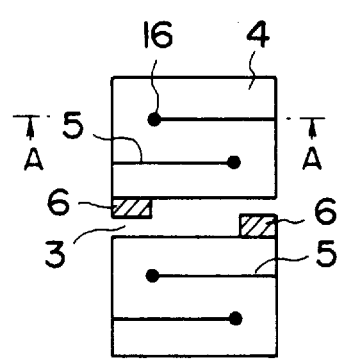
FIG. 7(b) is a plan view showing one-end opening sipes replaced by flask-shape sipes.
Figure 7C:
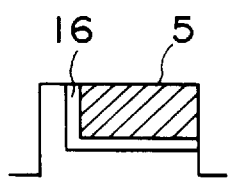
FIG. 7(c) is a sectional view cut along the line A—A shown in FIG. 7(b)

Further when resistance to block chipping is required to be further enhanced in heavy duty tires, it is preferable that a one-end opening sipe 5 is a flask-shaped sipe with its radially inner end formed enlarged, as shown in FIG. 7(b).

Particular examples of tires according to this invention will be explained with reference to the drawings.

An invention tire 1 used as an example 1 has a block pattern as shown in FIG. 1 in the tread 1, which is provided with rectangular blocks separated by four circumferential grooves 2 extending straight in parallel with the equatorial plane 8 of the tire and lateral grooves 3 crossing the equatorial plane 8 at right angles and crossing the circumferential grooves 2. FIG. 2(a) shows that two straight one-end opening sipes 5a, 5b, which open to the circumferential grooves 2a, 2b respectively and are closed in the block 4a, are formed alternately in the block 4. Further with respect to the blocks 4a, 4b separated by the lateral groove 3a, a platform 6a is arranged in a portion of the lateral groove 3a facing lateral end portions 12b, 12c having smaller rigidity in block portions 14 which are substantially separated by the one-end opening sipes 5b, 5c. The block has a length of 23 mm and a width of 30 mm, the circumferential groove 2 has a depth of 20 mm and a width of 10 mm, the lateral groove 3 has a depth except where the platform is provided of 15 mm, and the platform 6 has a groove depth at its position of 8 mm, a length of 10 mm and a width of 7 mm the same as that of the lateral groove 3. The one-end opening sipe 5 has a depth of 10 mm, a width of 0.5 mm and a length of 24 mm.

The invention tires 1–5 and comparative tires 1–2 are heavy duty pneumatic tires and have a tire size of 11R22.5.

An invention tire 2 used as an example 2 has blocks 4 as shown in FIG. 6 in the tread and the blocks 4 are separated by four circumferential grooves 2 extending straight in parallel with the equatorial plane 8 of the tire and lateral grooves 3 extending stepwise and slantwise between the circumferential grooves 2. Three straight one-end opening sipes 5b, 5c, 5d are formed alternately in the block 4. A platform 6a is arranged in a portion of the lateral groove 3a at the openings 7a, 7b of the one-end opening sipes 5a, 5b.

The platform 6a has a groove depth at its position of 8 mm, a length of 10 mm and the same width as the lateral groove 3. The block 4 has a maximum length of 30 mm and a minimum length of 10 mm, and a maximum width of 30 mm and a minimum width of 15 mm. The circumferential groove 2 has a depth of 20 mm and a width of 10 mm, and the lateral groove 3 has a depth except where the platform 6 is provided of 15 mm. The one-end opening sipes 5 have a depth of 10 mm and a width of 0.5 mm, and one-end opening sipes 5b, 5d adjacent the lateral grooves 3a, 3b have a length of 12 mm and the other one-end opening sipe 5c has a length of 24 mm.

An invention tire 3 used as an example 3 has a block arrangement as shown in FIG. 8 in the tread. This tire has the same structure as the tire of the example 1 except that the openings 7a, 7b of the one-end opening sipes 5a, 5b adjacent the lateral groove 3a are formed to open to different circumferential grooves 2a, 2b, the angle β1 formed by the groove wall portions 9a, 9c of the lateral groove 3a facing the lateral end portions 12a, 12b and the contacting surface 10 of the block is 110°, the angle β2 formed by the other groove wall portions 9b, 9d of the lateral groove 3a and the contacting surface 10 of the block is 90°, and a platform is not provided.

An invention tire 4 used as an example 4 has a block arrangement as shown in FIG. 9 in the tread. This tire has the same structure as the tire of the example 3 except that the angle γ1 formed by the groove wall portions 11a, 11c of the circumferential grooves 2 to which the one-end opening sipes 5 open and the contacting surface 10 of the block is 110°, the angle γ2 formed by other groove wall portions 11b, 11d and the contacting surface 10 of the block is 90°, and both angles β1, β2 are 90°.

An invention tire 5 used as an example 5 has a block arrangement as shown in FIG. 10 in the tread. This tire has the same structure as the tire of the example 3 except that the groove wall portions 9a, 9c of the lateral groove 3a facing the lateral end portions 12a, 12b are protruded from the other groove wall portions 9b, 9d by a length L of 2 mm, and both angles β1, β2 are 90°.

Figure 13:
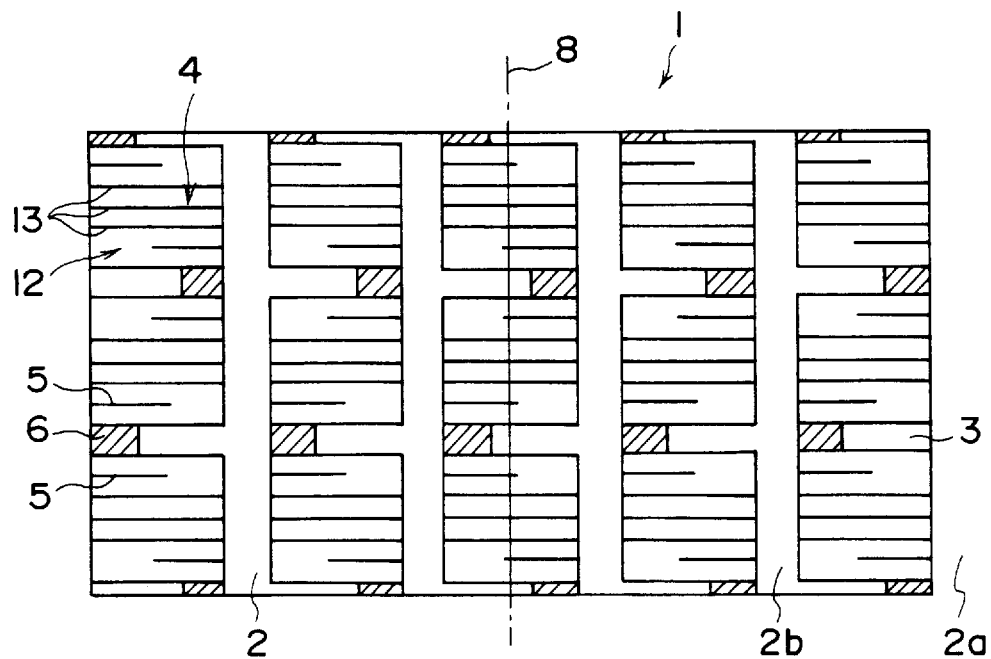
FIG. 13 shows a part of a tread pattern of an invention tire 6 used as an example 6.
Figure 14:
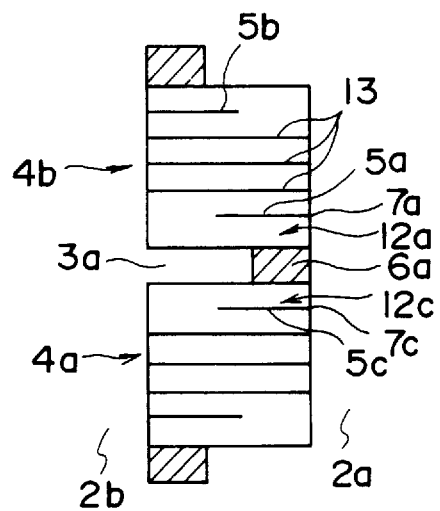
FIG. 14 is an enlarged view of a block of the block pattern as shown in FIG. 13.

An invention tire 6 used as an example 6 has a block pattern as shown in FIG. 13 (an enlarged view of the blocks 4a, 4b of this block pattern is shown in FIG. 14) in the tread 1, which is provided with rectangular blocks separated by four circumferential grooves 2 extending straight in parallel with the equatorial plane 8 of the tire and lateral grooves 3 crossing the equatorial plane 8 at right angles, and crossing the circumferential grooves 2. Two straight one-end opening sipes 5a, 5b, which open to the circumferential grooves 2a, 2b and are closed in the block 4b, are formed alternately in the block 4b. Further with respect to the blocks 4a, 4b separated by the lateral groove 3a, a platform 6a is arranged in a portion of the lateral groove 3a facing the lateral end portions 12a, 12c having small rigidity in block portions which are substantially separated by one-end opening sipes 5c, 5a. Furthermore three both-end opening sipes having constant depth are formed in a block portion between the one-end opening sipes 5a, 5b. The block 4 has a length of 20 mm and a width of 20 mm, the circumferential groove 2 has a depth of 10 mm and a width of 7 mm, the lateral groove 3 has a depth of 10 mm and a width of 5 mm, and the platform 6 has a groove depth at its position of 5 mm, a length of 7 mm and a width of 5 mm the same as the lateral groove 3. The one-end opening sipes and the both-end opening sipes have a depth of 7 mm and a width of 0.5 mm, and the one-end opening sipes 5a, 5b have a length of 12 mm.

The invention tire 6 and comparative tires 3–4 are passenger pneumatic tires and have a tire size of 185/70R13.

Figure 11A:
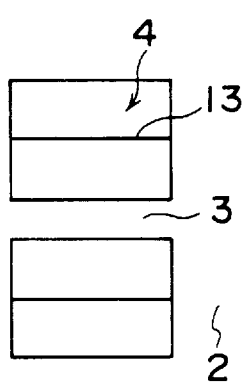
FIG. 11(a) is a plan view of a part of a tread of a comparative tire used as a comparative example 1.

Comparative tire 1 used as comparative example 1 has a conventional block pattern wherein the tread has blocks 4 as shown in FIG. 11(a), the block 4 has a both-end opening sipe 13, and this both-end opening sipe 13 has a depth of 7 mm and a width of 0.5 mm.

Figure 11B:
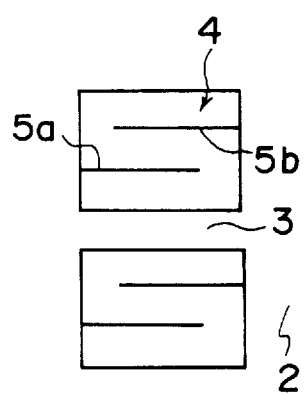
FIG. 11(b) is a plan view of a part of a tread of a comparative tire used as a comparative example 2.

Comparative tire 2 used as comparative example 2 has the same structure as the tire used as the comparative example 1, except that the tread has blocks as shown in FIG. 11(b), and the block 4 has two straight one-end opening sipes 5a, 5b formed alternately, instead of the both-end opening sipe.

Figure 15A:
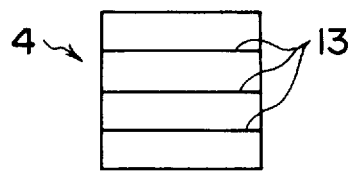
FIG. 15(a) is an enlarged view of a block of the block pattern of a comparative tire 3.
Figure 15A:
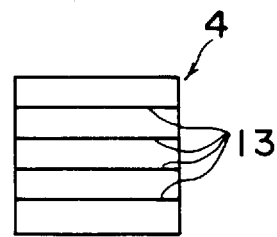

Comparative tire 3 used as comparative example 3 has a conventional block pattern wherein the tread has blocks 4 as shown in FIG. 15(a), the block 4 has three both-end opening sipes 13 having constant depth, and these both-end opening sipes 13 have a depth of 7 mm and a width of 0.5 mm.

Comparative tire 4 used as comparative example 4 has the same structure as the tire used as the comparative example 3, except that the tread has blocks as shown in FIG. 15(b), and the block 4 has four both-end opening sipes 13 having constant depth.

Braking performance on ice road surface and wet performance were evaluated with respect to the above mentioned test tires, classifying the tires as heavy duty tires (the invention tires 1–5 and the comparative tires 1–2) and as passenger tires (the invention tire 6 and the comparative tires 3–4) respectively. In addition, block chipping was also evaluated with respect to the heavy duty tires, and steering stability on dry road surface was also evaluated with respect to the passenger tires.

The braking performance test on ice road surface was evaluated by mounting tires on a vehicle and measuring the reciprocal value of the braking distance between braking point and stopped point after braking from a speed of 20 km/hr.

The wet performance test was evaluated by feeling of a driver driving on a wet road a vehicle on which 50% worn test tires were mounted.

The block chipping test (which was evaluated with respect to only heavy duty tires) was evaluated by observing block chipping after 20,000 km.

The steering stability test on dry road surface (which was evaluated with respect to only passenger tires) was evaluated by feeling of a driver driving a vehicle on which the test tires were mounted.

Table 1 and Table 2 show results of these tests. The values in Table 1 are on the basis that the result of the comparative tire 1 is 100, and the values in Table 2 are on the basis that the result of the comparative tire 3 is 100, wherein the larger the index value in the table, the better the result.

TABLE 1

|  | Braking performance on ice | Wet Performance (*1) | Block chipping |
| --- | --- | --- | --- |
| Comparative tire 1 | 100 | 100 | None |
| Comparative tire 2 | 103 | 102 | Observed |
| Invention tire 1 | 115 | 100 | None |
| Invention tire 2 | 110 | 100 | None |

TABLE 1-continued

|  | Braking performance on ice | Wet Performance (*1) | Block chipping |
|---|---|---|---|
| Invention tire 3 | 112 | 100 | None |
| Invention tire 4 | 110 | 100 | None |
| Invention tire 5 | 115 | 100 | None |

*1: Measured test tires with 50% worn tread.

TABLE 2

|  | Breaking performance on ice | Wet performance (*1) | Steering stability (*2) |
|---|---|---|---|
| Comparative tire 3 | 100 | 100 | 100 |
| Comparative tire 4 | 95 | 105 | 90 |
| Invention tire 6 | 120 | 100 | 100 |

*1: Measured test tires with 50% worn tread.
*2: Examined on dry road surface.

According to the test results in Table 1, the heavy duty invention tires 1–5 are better than comparative tires 1 and 2 with respect to the braking performance on ice. With respect to the wet performance, invention tires 1–5 have the same level as comparative example 1.

Incidentally, a passing noise test during driving a vehicle on which 50% worn test tires are mounted was also carried out, and the result was that the invention tires 1–5 which do not form blind grooves have substantially the same level as the comparative tires 1–2.

According to the test results in Table 2, the passenger invention tire 6 is better than comparative tires 1 and 2 with respect to the braking performance on ice. With respect to the wet performance, invention tire 6 has the same level as comparative example 1.

In tires according to the invention in comparison with the conventional tires, though the sipe density is made large, the deformation of the whole and a part of the block 4 can be restrained.

Further, in tires according to the invention, sufficient groove volume for drainage ability can be retained because the sipe density is made large and the lateral end portion 12 is reinforced locally and effectively.

In particular, in heavy duty tires, block chipping caused by driving and braking can be restrained, and in passenger tires steering stability can be retained.

In addition, in tires according to the invention, desired drainage property can be retained by reinforcing the lateral end portion 12 locally and effectively.

While the invention has been particularly shown and described with reference to certain preferred embodiments thereof, it will be understood by those skilled in the art that various modifications may be made without departing from the spirit and scope of the invention.

We claim:

1. A pneumatic tire having
   a tread provided with blocks separated by circumferential grooves extending around the tread and lateral grooves crossing the circumferential grooves, the blocks being provided with plural lateral sipes, and each block having one block portion and another block portion, a first lateral end portion and a second lateral end portion of the one block portion being substantially separated by a lateral sipe, and a third lateral end portion and a fourth lateral end portion of the another block portion being substantially separated by a lateral sipe, the first lateral end portion of each block being less rigid than the second lateral end portion of each block and the fourth lateral end portion of each block being less rigid than the third lateral end portion of each block, the blocks including a row of blocks having one side and an opposite side, the first lateral end portions and the third lateral end portions being on the one side of the row of blocks, and the second lateral end portions and the fourth lateral end portions being on the opposite side of the row of blocks, the first and second lateral end portions of one block and the first and second lateral end portions of another block being separated from each other by one of the lateral grooves, the third and fourth lateral end portions of the another block and the third and fourth lateral end portions of a block adjacent to the another block being separated by another lateral groove, a plurality of reinforcing means being located in the lateral grooves to redress a difference of rigidity between lateral end portions of each block portion, the plurality of reinforcing means being alternately arranged such that one of said plurality of reinforcing means is on the one side of the row of blocks and in the one lateral groove which separates the first lateral end portions and another of said reinforcing means is on the opposite side of the row of blocks in the another lateral groove which separates the fourth lateral end portions, each reinforcing means not being located in a circumferential groove;

wherein each reinforcing means is a platform and the height, the length in the circumferential direction, and the lateral width of the platform are respectively 0.25–0.7.5 times as large as the depth of a respective one of the lateral grooves, 0.5–1.0 times as large as the width of the respective one lateral groove, and 0.2–0.5 times as large as the width of a respective one of said blocks.

2. The pneumatic tire according to claim 1, wherein each lateral sipe is a one-end opening sipe with one end opening to one of said circumferential grooves or one of said lateral grooves and with the other end substantially being closed in a respective one of said blocks.

3. The pneumatic tire according to claim 1, wherein each lateral sipe is a both-end opening sipe with its both ends opening to circumferential grooves or lateral grooves and with its sipe depth at one end shallower than that at the other end.

4. The pneumatic tire according to claim 1, wherein said lateral sipes are parallel to said lateral grooves.

* * * * *